United States Patent [19]
Weingarten et al.

[11] Patent Number: 5,570,744
[45] Date of Patent: Nov. 5, 1996

[54] SEPARATOR SYSTEMS FOR WELL PRODUCTION FLUIDS

[75] Inventors: Jean S. Weingarten, Anchorage, Ak.; Miroslav M. Kolpak, Dallas, Tex.; Scott A. Mattison, Anchorage, Ak.; Ronald G. Oba, Anchorage, Ak.; M. Jane Williamson, Anchorage, Ak.

[73] Assignee: Atlantic Richfield Company, Los Angeles, Calif.

[21] Appl. No.: 442,946

[22] Filed: May 17, 1995

Related U.S. Application Data

[63] Continuation-in-part of Ser. No. 345,224, Nov. 28, 1994, Pat. No. 5,431,228.

[51] Int. Cl.$^6$ .............. E21B 43/34; E21B 43/40
[52] U.S. Cl. ............. 166/357; 210/195.1; 210/512.1; 55/399; 55/457
[58] Field of Search ............ 166/357; 55/337, 55/399, 423, 426, 456, 457; 210/195.1, 512.1

[56] References Cited

U.S. PATENT DOCUMENTS

| | | | |
|---|---|---|---|
| 513,090 | 1/1894 | Day | 55/399 |
| 1,393,066 | 10/1921 | Atkinson | 55/457 |
| 1,628,900 | 5/1927 | Neilsen . | |
| 1,804,554 | 5/1931 | Dubbs | 55/457 X |
| 1,931,135 | 10/1933 | McLaughlin et al. | 55/457 X |
| 2,147,671 | 2/1939 | Pratt | 55/457 X |
| 2,190,596 | 2/1940 | Dorr | 210/195.1 X |
| 2,349,164 | 5/1944 | Gilbert . | |
| 2,398,339 | 4/1946 | Watts . | |
| 2,413,324 | 12/1946 | Holzwarth | 55/457 X |
| 2,574,370 | 11/1951 | Bailey | 55/457 X |
| 2,652,130 | 9/1953 | Ferguson . | |
| 2,843,053 | 7/1958 | Carle . | |
| 2,860,618 | 11/1958 | Mansfield | 55/457 X |
| 2,928,494 | 3/1960 | Sams et al. | 55/457 X |
| 2,941,783 | 6/1960 | Stinson | 210/512.1 X |
| 2,970,669 | 2/1961 | Bergson | 55/457 X |
| 3,048,122 | 8/1962 | Hansen . | |
| 3,128,719 | 4/1964 | Jongbloed et al. . | |
| 3,339,350 | 9/1967 | Sims | 55/337 X |
| 3,349,548 | 10/1967 | Boyen | 55/457 |
| 3,353,752 | 11/1967 | Ranhagen et al. | 210/512.1 X |
| 3,423,294 | 1/1969 | Sephton | 55/456 X |
| 3,516,490 | 6/1970 | Smalling et al. | 166/357 |
| 3,713,279 | 1/1973 | Moore | 55/399 X |
| 3,895,930 | 7/1975 | Campolong | 55/399 X |
| 4,179,273 | 12/1979 | Montusi | 210/512.1 X |
| 4,481,020 | 11/1984 | Lee et al. | 166/105.5 X |
| 4,981,175 | 1/1991 | Powers | 166/105.5 X |
| 4,982,794 | 1/1991 | Houot | 166/357 |
| 5,180,486 | 1/1993 | Smolensky et al. | 210/195.1 |

Primary Examiner—Roger J. Schoeppel
Attorney, Agent, or Firm—Michael E. Martin

[57] ABSTRACT

Hydrocarbon fluid production wells and similar process flowstreams have a spiral baffle-type separator interposed in a surface flowline for separating fluids of different densities, such as gas from oil or gas from oil and from water, for example. Particulate solids may also be separated from the fluid flowstream. The separator includes a spiral baffle of single or multiple diameters interposed in an elongated cylindrical casing connected at its opposite ends to suitable fittings whereby the separator may be connected to conventional fluid flowlines on the surface just downstream of a wellhead or otherwise in a process flowstream. Multiple spiral baffle separators may be connected in series to provide multiple stages for separation of fluids of different densities. The separator is particularly compact, mechanically uncomplicated and may be easily adapted to be interposed in well production fluid flowlines or conduits for process flowstreams.

28 Claims, 4 Drawing Sheets

5,570,744

1

SEPARATOR SYSTEMS FOR WELL PRODUCTION FLUIDS

CROSS REFERENCE TO RELATED APPLICATION

This application is a continuation-in-part of U.S. patent application Ser. No. 08/345,224, filed Nov. 28, 1994, now U.S. Pat. No. 5,431,228.

FIELD OF THE INVENTION

The present invention pertains to single and multi-stage separator systems, particularly adapted to be interposed in surface disposed flowlines for separating well production fluids.

BACKGROUND

The above-referenced patent application pertains to so-called downhole, spiral or stationary auger type separator devices, primarily adapted for separating gas from liquid being produced from a hydrocarbon fluid production well. In certain wells which produce hydrocarbon fluids, for example, both gas and liquids are produced simultaneously directly from one or more production zones. Gas and liquid may also be produced simultaneously from wells which utilize artificial gas lift or which are producing oil which has been driven to the production well by pressurized gas injection into the subterranean reservoir. Accordingly, elaborate and expensive separation and treatment facilities are usually required to separate gas from production liquids. In some instances, it is also desirable to separate more dense gasses or liquids from less dense gasses or liquids in wells which are producing various types of hydrocarbon fluids, such as both water and crude oil, for example.

As well operating conditions change with respect to the relative amounts of oil and gas being produced, or the relative amounts of oil, water and gas, it is often necessary to modify the separator facilities. Still further, changing proportions of oil, water and gas, for example, can cause slug flow in the fluid production flowlines, and can put undue loading on all or portions of the existing separator facilities. Moreover, if the separated gas is to be used for reservoir injection or for artificial gas lift in other wells, the remote location of conventional separator facilities usually requires extensive piping to return the gas to the injection wells or the wells using gas lift.

Downhole separation of gas from liquids can provide a high pressure gas source for gas lift and for compression by nearby disposed compressors for reinjection. Downhole separation will usually also provide higher pressure gas at the surface due to reduced pressure losses in the flow conduits. However, insertion of and retrieval of a downhole separator, such as the types described in the above-mentioned patent application can be somewhat difficult and expensive to accomplish. Moreover, changing flow conditions may dictate a change in the separator position, size or other design features, and premature wear due to abrasives in the fluid flowstream may also require repair or replacement of the separator. Accordingly, a downhole location of the separator can require expensive and time consuming operations to replace or repair the separator itself.

On the other hand, surface installation of an inline spiral or so-called auger type separator may be easily accomplished by inserting the separator structure in a conventional flowline with minimal interruption of well operations and

2 with minimal expense with regard to equipment costs. Existing valving and controls may be utilized to a large extent in the flowlines, and no expensive installation procedures or structures are required, such as support pads, buildings or other enclosures usually necessary for conventional separator systems. Still further, surface disposed inline type separators may be arranged in multistage configurations to obtain substantial gas-liquid separation, separation of gasses and/or liquids of different densities from each other and/or separation of particulate solids from gas and/or liquids. Separation of gas at the surface and adjacent to the fluid production well may also minimize piping requirements if the separated gas is required for reservoir injection or artificial gas lift. Certain processes may also favor separation of water from oil and transport of these liquids in separate conduits to minimize corrosion problems. For example, it may be advantageous to separate water or brine from produced oil and conduct these fluids in separate flowlines to a process facility and wherein certain corrosion inhibitors may be injected into the oil or water flowlines to minimize corrosion. Such arrangements would be beneficial wherein, for example, the corrosion inhibitors would not be suitable for mixing with one or the other of the fluids due to its process requirements. Still further, a mechanically simple, low cost separator which is at least capable of partial gas-liquid separation or partial separation of fluids of different densities is desirable and is particularly useful for separating produced fluids in many hydrocarbon production well operations and in other fluid process applications.

SUMMARY OF THE INVENTION

The present invention provides a unique surface flowline or so-called inline type separator system, particularly adapted for use in connection with fluid production wells for separating fluids of different densities including separating liquid from gas, separating liquids of different densities from each other and separating particulate solids from a major portion of a fluid flowstream.

In accordance with one important aspect of the invention, a separator system is provided for disposition in a surface flowline between a wellhead and fluid processing or transport facilities and which includes a so-called stationary auger or spiral type baffle interposed in a casing in such a way as to provide separation of gas from liquid, separation of gasses or liquids of different densities and separation of particulate solids and some fluid from other fluids, for example.

The present invention is also characterized by a separator device wherein a spiral or helical type baffle is insertable in a casing comprising a portion of a flowline in such a way as to induce generally spiral or helical flow of fluids to effect separation of more dense fluids from less dense fluids and wherein the less dense fluids flow along a generally central flow path within the casing. The system may include multiple stages of separator devices which are operable to effect greater separation of gas from liquid, or separation of gasses of different densities or liquids of different densities from each other, as desired.

The present invention also provides a spiral, inline type separator which is particularly adapted to be easily inserted in a surface flowline leading from a production well or other fluid source. The separator devices of the invention are particularly compact and easy to insert in a production fluid flow network, whether already existing or being newly designed. Only minimal modification to the existing flow distribution system is required. Moreover, in applications for separating gas from oil and other liquids, at least partial separation is easily obtained and the gas may be routed directly back to an injection well or, in particular, used for artificial gas lift without further separation steps being required. If desired, however, the separators may be easily staged to maximize separation of gas from liquid, particulate solids from a major portion of the fluid flow-stream or fluids of different densities from each other.

Still further, the present invention contemplates the provision of single and multistage, inline, spiral-type separator systems for fluid flowlines wherein the systems may be controlled to minimize carryover of fluids into the flowline for the separated fluid.

Although the separator systems of the invention are particularly useful in separating fluids in surface flowlines leading from fluid production wells, the separator systems may be utilized in other applications in conjunction with the production and processing of hydrocarbon fluids as well as other fluid processes, including disposition in fluid lines ahead of flow metering devices.

Those skilled in the art will further appreciate the above-mentioned features and advantages of the invention together with other superior aspects thereof upon reading the detailed description which follows in conjunction with the drawing.

DESCRIPTION OF PREFERRED EMBODIMENTS

Figure 1:
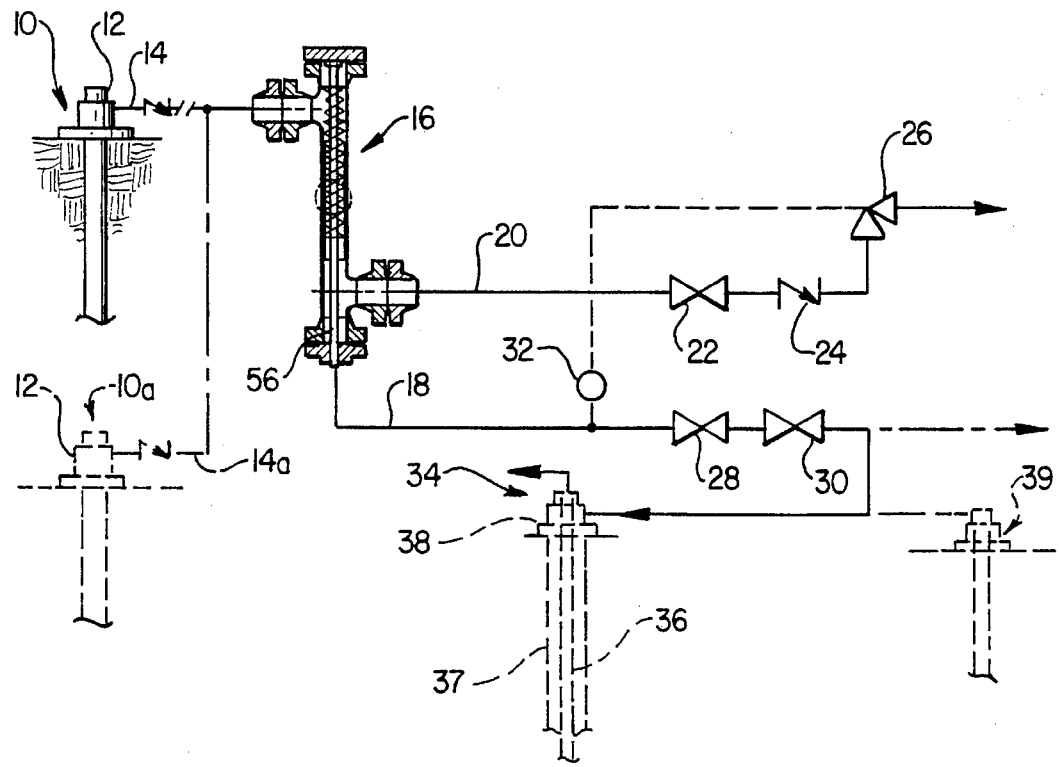
FIG. 1 is a schematic diagram of a surface flowline separator system for separating fluids from a production well in accordance with the present invention.

In the description which follows, like elements are marked throughout the specification and drawing with the same reference numerals, respectively. The drawing figures are not necessarily to scale in the interest of clarity and conciseness.

Referring to FIG. 1 there is illustrated, in schematic form, a hydrocarbon fluid production well 10 which may be operating to produce a mixture of oil and gas and/or a mixture of oil, gas and water, for example. The production well 10 has a conventional wellhead 12 and a production fluid flowline 14 connected to the wellhead for conducting the fluid mixture described above to a suitable processing facility, not shown. In accordance with the invention, a unique so-called stationary auger or spiral type separator device 16 is connected to the flowline 14 for receiving the fluid mixture being conducted therethrough. As shown, more than one production well may be operably connected to the flowline 14. A second well 10a is shown by way of example having a wellhead 12 and a production fluid flowline 14a connected thereto and to the flowline 14. Those skilled in the art will appreciate that the fluid stream flowing to the separator 16 may be from several wells, from only one well, or from another source.

The separator 16 is adapted to separate at least a portion of the gas in the fluid mixture from the liquid for discharge from the separator by way of a conduit 18. Liquid separated from the gas is discharged from the separator 16 by way of a conduit 20. The liquid conduit 20 is operable to have a conventional emergency shutdown valve 22 interposed therein as well as a conventional check valve 24 and a controllable throttling valve 26 interposed in the conduit 20 downstream of the check valve 24. Fluid leaving the valve 26 may be conducted to a suitable common line, manifold or processing facility, not shown.

Gas separated from the fluid stream in the separator 16 is conducted through the conduit 18, having a suitable emergency shutdown valve 28 interposed therein, and a manual or motor controlled throttling valve 30 also interposed in the conduit 18. A suitable pressure sensor and controller 32 is operable to sense the pressure in the conduit 18 and control the valve 26 to adjust the flow rate through the conduit 20 so that a suitable controlled flow rate of fluid is provided through the separator 16. Moreover, the controllable throttling valve or choke 30 is operable to partially throttle the flow of gas separated in the separator 16 and flowing through the conduit 18 during startup of the system shown in FIG. 1, or in response to any substantial changes in the flow rate through the system.

FIG. 1 illustrates one final use of the gas separated from the flowstream in the separator 16. As shown, the separated gas may be conducted to a well 34 which is operating on gas lift to produce fluids through a tubing string 36 in a conventional manner. Gas may be conducted to the wellhead 38 of the well 34 and down through an annulus provided between the tubing string 36 and a casing 37 for entry into the tubing string by way of conventional gas lift valves, not shown. Accordingly, if the gas leaving the separator 16 is at a suitable pressure, it may be conducted directly to a gas lift well, such as the well 34, or a gas injection well 39. Alternatively, gas flowing in the conduit 18, if sufficiently free of liquid, may be compressed before further processing, such as injection into the wells 34 or the injection well 39. Gas flowing through the conduit 18 may, of course, be conducted to other facilities for processing, as desired.

Figure 3:
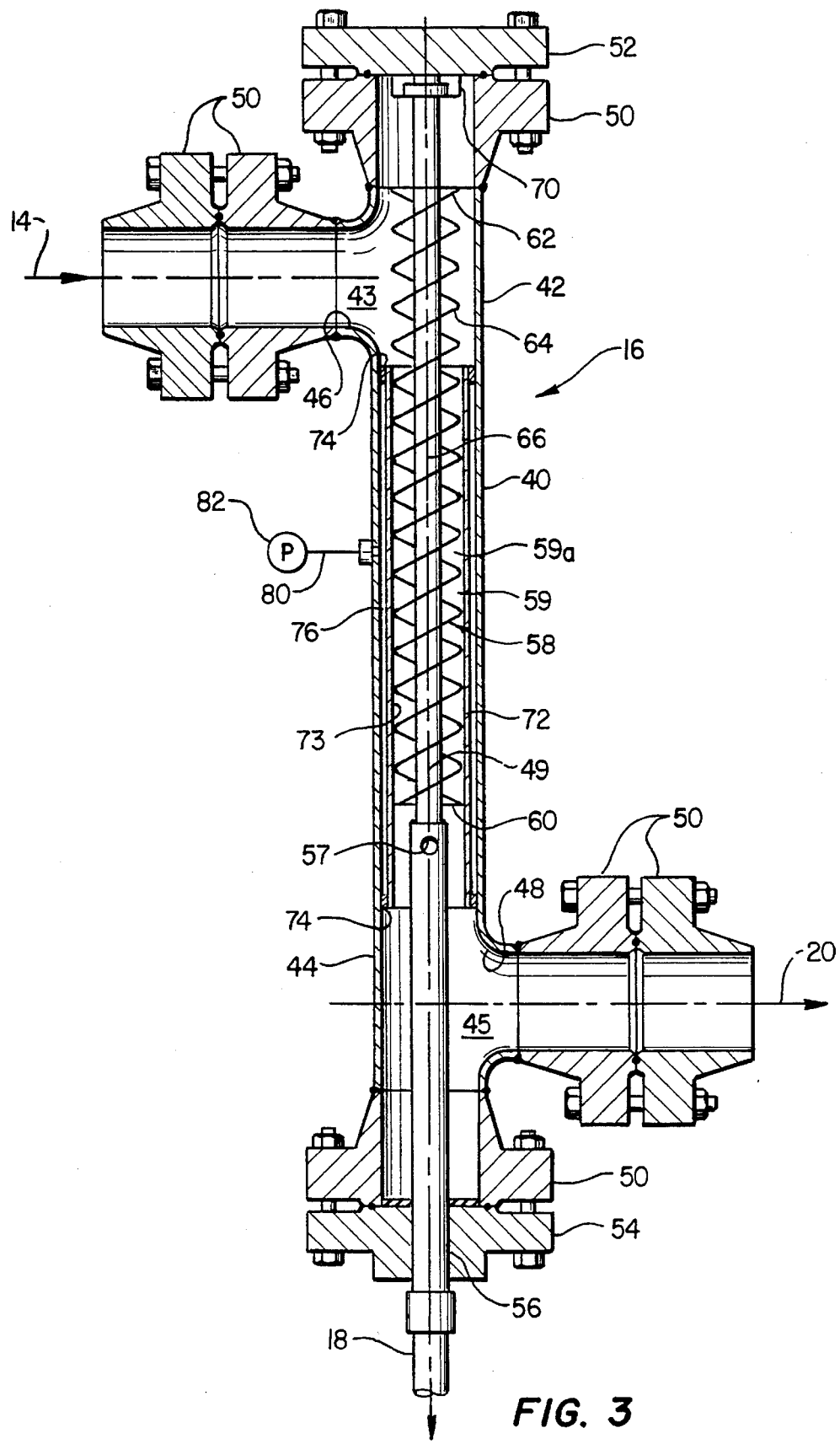
FIG. 3 is a longitudinal central section view of one embodiment of a separator in accordance with the invention.

Referring now to FIG. 3, a preferred embodiment of the separator 16 is shown in detail. The separator 16 is preferably characterized by an elongated outer, generally cylindrical casing part 40 having conventional conduit tee fittings 42 and 44 connected thereto at opposite ends. The conduit fitting 42 provides a fluid inlet port 46 and the fitting 44 has a fluid discharge port 48 for the separator 16. The ports 46 and 48 are disposed, respectively, at 90 degrees or right angles to the longitudinal central axis 49 of the casing part 40.

Conventional pipe flanges 50 are suitably connected, such as by welding, to the conduit fitting 42 and to the conduit 14 for coupling the conduit 14 to the separator 16. In like manner, conventional pipe flanges 50 are also connected to the conduit fitting 44 and the liquid discharge conduit 20 for coupling the liquid discharge conduit to the separator 16. Still further, conventional pipe flanges 50 are also connected to the conduit fittings 42 and 44 at one end of the axial branch of the fittings, respectively, as shown. A blind flange 52 is connected to the flange 50 at the conduit fitting 42, forming a closure at the inlet end of the separator 16 and a flange 54 is connected to the flange 50 at the conduit fitting 44 to form a closure at the opposite end of the separator 16. A central axial gas discharge conduit 56 extends through a suitable bore in the flange 54 in fluid tight engagement therewith and within the conduit fitting 44 and the outer casing 40, as illustrated. The gas discharge conduit 56 is suitably connected to the conduit 18, as shown, and to the flange 54.

The separator 16 is provided with an elongated stationary spiral or helical baffle, generally designated by the numeral 58 extending through the conduit fitting 42, through the casing 40 and terminating at a discharge end 60. The baffle 58 is formed of relatively thin, platelike, double helical baffle flights 62 and 64 which are disposed around and formed integral with or otherwise suitably secured to an elongated cylindrical hub 66. The hub 66 extends coaxially from the flange 52 through casing 40 and is connected to the gas discharge conduit 56. The hub 66 is also suitably journalled in a boss 70 supported on the flange 52. The term spiral as used herein is to denote that the flow direction is progressively along an axis, such as the axis 49, and in a somewhat helical orbital path about such axis through passages 59, 59a, which are in communication with passages 43 and 45 defined by the fittings 42 and 44, respectively. The geometry of the baffle 58 may be a constant or variable pitch helix of constant or variable inner or outer diameter. The baffle 58 may also be formed of single or multiple flights.

The helical baffle 58 is disposed within an inner, generally cylindrical tubular casing 72 and the radial extremities of the helical flights 62 and 64 are preferably contiguous with the inner wall of the casing 72 but not necessarily connected thereto. The baffle 58 may be held stationary with respect to casing parts 72 and 40 by its connection to conduit 56 and/or the boss 70. The inner casing 72 is coaxially spaced from the casing 40 and is supported in the casing 40 by opposed spaced apart cylindrical collars 74 at each end thereof to define a closed annular space 76 between the collars and between the casings 40 and 72. The space 76 is operable to be in communication with a conduit 80 which may be connected to a suitable pressure sensor 82 to detect fluid pressure within the annular space 76 in the event that the casing 72 should become eroded or corroded through. Due to the high velocities of fluid flowing through the casing 72 and the induced spiral flow of the fluid, any particulate solids entrained in the fluid flowstream may tend to erode the conduit 72 to a point where fluid leakage therefrom may occur. Accordingly, by monitoring fluid pressure in the annular space 76, failure of the casing 72 may be detected.

The operation of the separator 16 is believed to be within the purview of one of skill in the art of fluid separators from the foregoing description. However, briefly, mixed phase fluid entering the separator 16 by way of the conduit fitting 42 is induced to flow in the substantially spiral or helical flowpaths 59, 59a through the inner casing 72 under the inducement of the baffle flights 62 and 64. The spiral or helical flow induced in the fluid by the baffle 58 will cause the more dense fluids to flow toward the inner wall 73 of the casing 72 while less dense fluid, such as gas, will flow along the spiral flow paths closer to the hub 66. As the fluid flow discharges from the baffle 58, the less dense fluid, such as gas, will flow through suitable ports 57 in the gas discharge conduit 56 and then through the conduit 56 to the conduit 18. More dense fluid, such as oil or a mixture of oil and water, will flow into the conduit fitting 44 and then through the discharge flow path provided by the port 48 and conduit 20.

The orientation of the separator 16 may be either substantially vertical, inclined or horizontal as regards the attitude of the longitudinal central axis 49. As mentioned previously, a particular advantage of the separator 16 is that it may be easily interposed in a flowline from one or more wells at any desired point since the separator 16 is particularly compact and may comprise a section of the flowline.

By way of example, a separator 16 having a baffle 58 of about 5.50 inch outside diameter, a hub diameter of 2.25 inches, a helical pitch of about 6.0 inches and having an overall length of about 45.0 inches is interposed in a conventional steel inner casing 72 which is disposed in an outer steel casing having a nominal diameter of 8.0 inches. The casing fittings 42 and 44 are formed of conventional steel pipe tee fittings of eight inch nominal diameter. The gas discharge conduit 56 is 2.50 inch diameter Schedule 160 Steel Pipe with four 1.0 inch diameter openings comprising the gas discharge openings 57.

A separator 16 having the above-described dimensions was tested for separating gas from oil wherein between at least forty-four percent of the gas in the fluid mixture to as much as ninety percent of the gas in the mixture was separated and removed from the separator 16 through the conduit 56. The gas-to-oil ratio in the fluid mixture entering the separator 16 ranged from 10:1 to 13.8:1 (thousands of standard cubic feet per stock tank barrel), total gas flow rate ranged from 30 million standard cubic feet per day to 32.6 million standard cubic feet per day and the liquid flow rate ranged from 2,360 to 3,000 barrels of crude oil per day. Operating pressures ranged from 1650 psi to 1860 psi. Gas separation was controlled by controlling the flow rate of gas through the discharge conduit 18 and setting a control pressure with the sensor 32 and the associated controller for the throttling valve 26. Operating conditions of the system illustrated in FIG. 1 are, thus, controlled by setting a predetermined gas pressure in the conduit 18 and throttling the flow of fluid leaving the separator through the conduit 20 to maintain the pressure in the conduit 18 at the set point.

Figure 2:
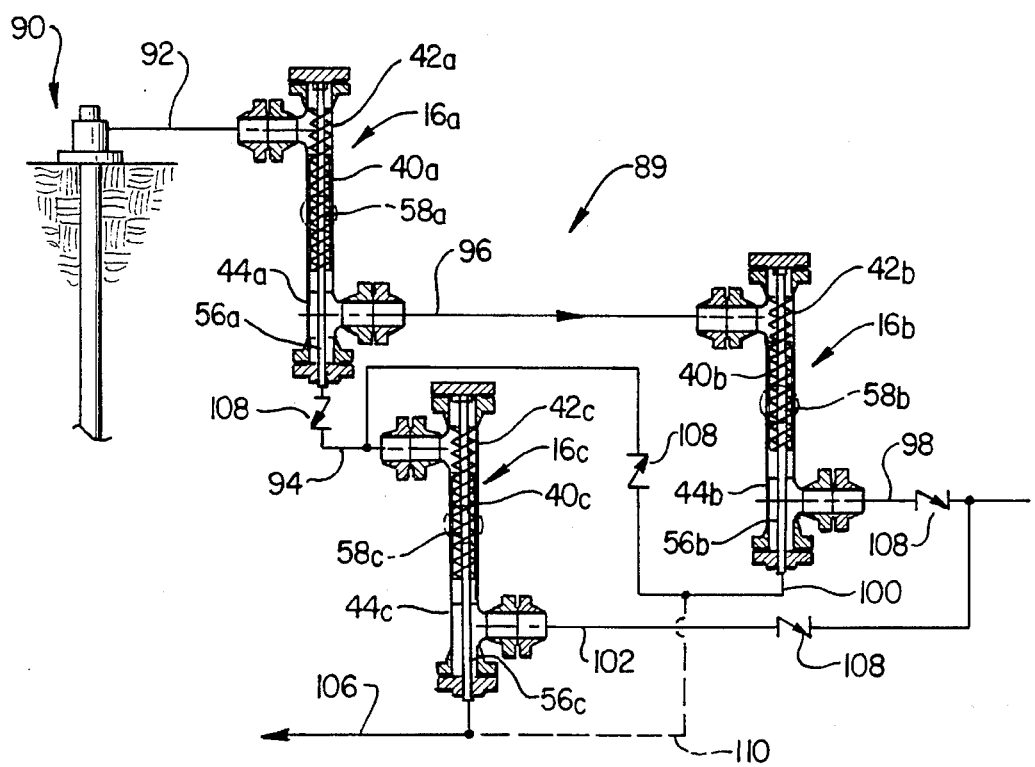
FIG. 2 is a schematic diagram of one embodiment of a multistage separator system for separating fluids from a production well flowstream.

Although partial separation of gas from liquid may be all that is necessary in operations such as contemplated by the arrangement of FIG. 1, wherein the separated gas is used as lift gas for the well 34, the unique separator 16 may also be provided in multiple stages to provide more complete separation of one fluid from another. Referring to FIG. 2, for example, there is illustrated a separator system 89 wherein a mixed phase, gas and liquid, fluid stream is being produced from a well 90 by way of a surface flowline 92 to a separator 16a. At least separation of gas from liquid in the flowstream from the well 90 may be accomplished in the separator 16a wherein a major portion of the gas is discharged from the separator 16a by way of a discharge line 94 and a major portion of the liquid is discharged from the separator 16a through a discharge line or conduit 96. The conduit 96 is connected to the inlet casing fitting 42b of a second separator 16b wherein additional separation of gas from liquid may occur and substantially gas free liquid may be discharged through the fitting 44b of separator 16b to a liquid flowline 98. Simultaneously, gas is discharged from the second separator 16b by way of a gas discharge flowline 100 which may be connected to the gas discharge line 94 leading to a third separator 16c which is receiving gas from the discharge line 94 at its inlet fitting 42c and is discharging substantially gas-free liquid through a liquid discharge line 102. Discharge line 102 may be connected to the liquid discharge line 98, as shown.

In the arrangement illustrated in FIG. 2, substantially liquid-free gas is discharged from the separator 16c by way of a discharge conduit 106. Suitable check valves 108 may be interposed in the respective discharge conduits as illustrated in FIG. 2, to prevent reverse flow of fluids into the respective separators 16a, 16b and 16c. Moreover, if the gas discharged from the separator 16b is substantially liquid-free, it may be conducted directly to the gas discharge conduit 106 by way of a bypass conduit 110. Other series arrangements of separators 16, 16a, 16b and 16c may be provided depending on whether or not the respective fluids being separated are required to be completely free of the other fluids. The separators 16a, 16b and 16c are virtually identical to separator 16 except they may be of different sizes with respect to baffle diameter and pitch, for example, to more effectively separate expected fluid volumetric flow rates. Again, the unique advantages of the separator 16 are applicable to various configurations of single and multistage separator systems which will be appreciated by those skilled in the art from the description of the systems illustrated in FIGS. 1 and 2.

Although the separators 16, 16a, 16b and 16c are particularly adapted for and useful in separating gas from liquid in hydrocarbon well production operations, these separators and the systems disclosed herein may also be used in other fluid process applications for separating single phase fluids of different densities from each other and separating particulate solids from a fluid flowstream by removing the solids from the flowstream with a portion of a carrier fluid for the solids, which fluid may be more dense than other fluids in the flowstream. In other words, particulate solids may be separated from a flowstream of a fluid of uniform density by drawing off a portion of the fluid as a carrier for the particulate solids and allowing substantially solids-free fluid to flow through the discharge conduit 56 of the separator 16, for example. The separator system 89, for example, may also be used to separate oil from water whereby separate flowstreams of oil and water may be conducted from the system by way of the conduits 106 and 98, respectively, assuming water is the more dense fluid.

Figure 4:
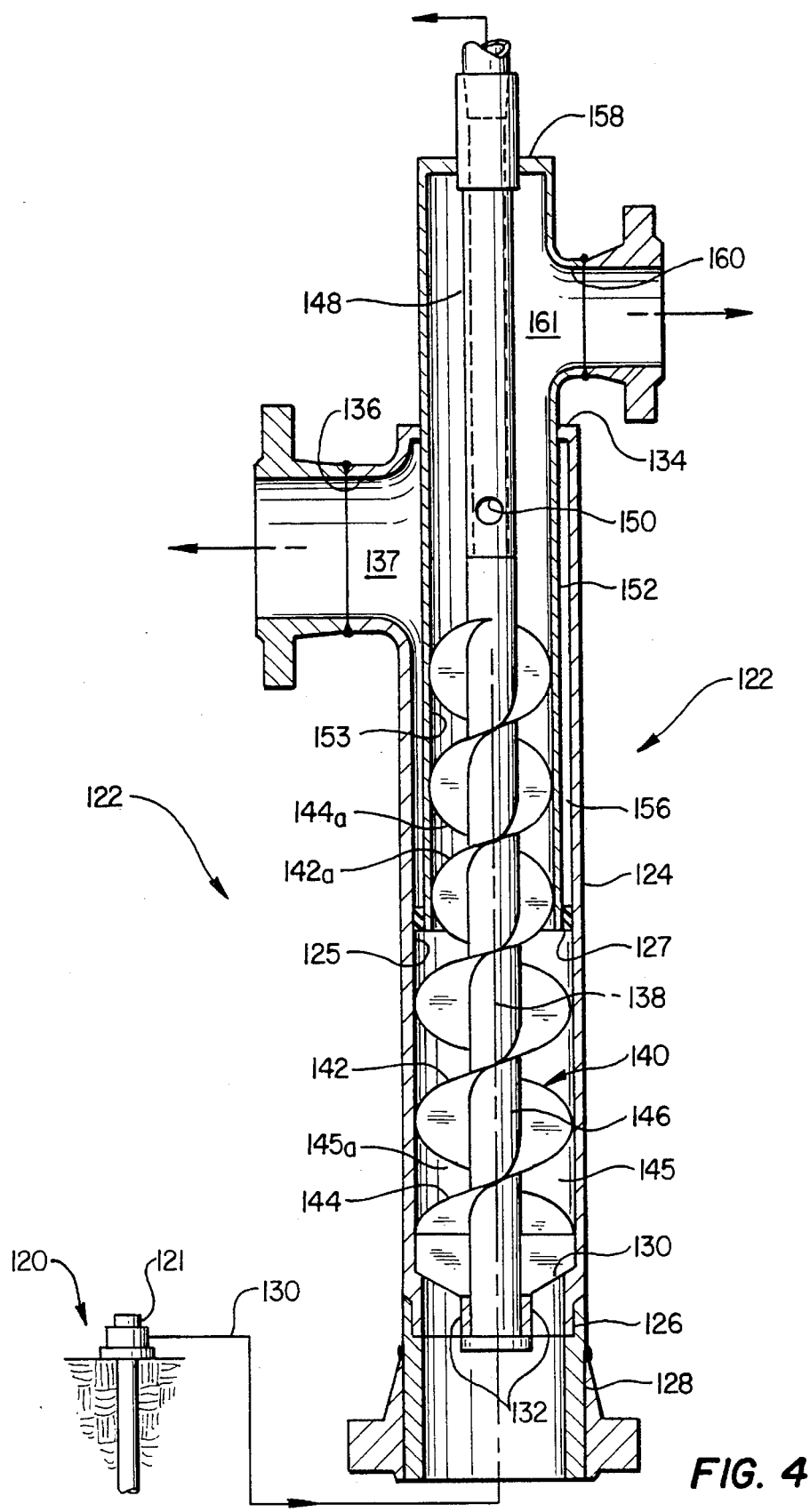
FIG. 4 is a longitudinal central section view of an alternate embodiment of an inline separator in accordance with the present invention.

Referring now to FIG. 4, there is illustrated another embodiment of a multistage separator system in accordance with the invention, generally designated by numeral 112, and also particularly adapted to separate fluids of various densities and/or particulate solids from a fluid flowstream being discharged from a source such as a hydrocarbon fluid production well 120, for example. The separator system 112 includes a multistage spiral baffle type separator 122 having an elongated, generally cylindrical, tubular, outer casing section 124, including a fluid inlet end 126 connected to a suitable flanged inlet conduit 128. The conduit 128 is in communication with a surface flowline 130 connected to a conventional wellhead 121 of the well 120. The source flowstream for the separator 122 may be one or more production wells or the separator may be interposed elsewhere in a fluid process flowstream.

Referring further to FIG. 4, the outer casing 124 includes a first support web portion 130 adjacent the inlet end 126 and having plural fluid ports 132 formed therein. A transverse end wall 134 is formed opposite the inlet end 126 and a fluid discharge port 136 extends generally normal to a longitudinal central axis 138 of the outer casing 124. An elongated, stationary multiple diameter baffle 140 is interposed in the casing 124 and includes helical baffle flights 142 and 144 disposed around a generally cylindrical hub 146. The hub 146 is supported at one end by the web 130, as shown, extends toward the opposite end of the separator 122 and is connected to a central axial discharge conduit 148 having fluid inlet ports 150 formed therein.

The separator 122 includes a second stage defined in part by a generally cylindrical tubular inner casing part 152 disposed within the casing 124 in concentric relationship therewith. The casing part 152 is, as shown, of smaller diameter than the diameter of an inner wall 125 of the casing part 124 and is supported therein by a ported collar 127 and by the end wall 134. An annular flow channel 156 is formed between the casing parts 124 and 152 and which is in communication with the discharge port 136. The inner wall 153 of the casing part 152 is of a diameter smaller than the diameter of the baffles 142 and 144. Accordingly, a second stage spiral baffle is formed having baffle flights 142a and 144a disposed in the casing part 152 and being contiguous with but of smaller outside diameter than the respective baffle flights 142 and 144. The casing part 152 has a transverse end wall 158 formed at an end opposite the ported collar 127 and a transverse fluid discharge port 160 for discharging relatively dense fluid separated in the separator section formed by the baffle flights 142a and 144a and the casing part 152. The port 160 defines a flow path extending generally normal to the axis 138 also. The baffles 142, 142a, 144 and 144a define spiral passages 145 and 145a in communication with the inlet conduit 128 and discharge passages 137 and 161.

The separator 122 is operable to separate fluids of at least three different densities from each other and/or to separate particulate solids from one or two fluids of different densities flowing through the separator. A mixed phase flowstream having fluids of different phases and different densities, a single phase fluid flowstream having fluids of different densities and/or a fluid flowstream having particulate solids entrained therein may undergo at least partial separation in the separator 122. Fluid entering the inlet conduit 128 will flow through the separator section defined by the baffles 142 and 144 wherein the spiral flowpath induced in the flowstream will cause the more dense fluid and particulate solids, for example, to move toward the inner wall 125 and enter the annular channel 156 at the inlet end of the casing 152 through the ported collar 127. Lower density fluid or fluid mixture will flow through the separator stage defined by the baffles 142a and 144a wherein the more dense fluid of such a mixture will flow along the wall 153 and the less dense fluid of the mixture will tend to flow along the hub 146 and enter the ports 150 of the discharge conduit 148. Fluid flowing along or tending to move toward the wall 153 will flow out of the separator through the discharge port 160.

By way of example, a multiphase fluid flowstream comprising crude oil, water and natural gas may be separated by the separator 122 wherein water will be separated by the separator stage defined by the baffles 142 and 144 to flow out of the separator through the annular flowpath 156 and the discharge port 136. A mixture of oil and gas will enter the separator stage defined by the baffles 142a and 144a wherein separation of gas from liquid will occur in the same manner as described above for the separator 16 whereby gas will flow out of the separator through the conduit 148 and liquid, such as crude oil, will flow out of the separator through the discharge port 160.

The separator 122 may also operate to separate liquids of different densities and separate particulate solids entrained in the flowstream, which are likely, depending on their density, to migrate toward the wall 125 and be discharged through the annular passage 156 and the discharge port 136 with some of the most dense carrier fluid in the mixture. Accordingly, the multistage separator 122 may effectively separate water, gas and oil at a point directly downstream of a source of a mixture of these fluids, such as a hydrocarbon fluid production well, for example. The separated oil, water and gas may be conducted separately to disposal or to uses in accordance with a system for handling these fluids without requiring transport of the fluids long distances to more elaborate separator facilities.

The configuration of the separator 122 is advantageous in some respects in that the inlet conduit 128 is coaxial with the baffle longitudinal axis, which axis is coincident with the axis 138. On the other hand, the configuration of the separator 16 is advantageous in that, by providing for the inlet port 46 and outlet port 48 to be transverse to the axis 49, the baffle 58 may be removed from one end or the other of the separator by removal of the flange 52 or 54, for example, without disassembling the flowlines 14 or 20.

Figure 5:
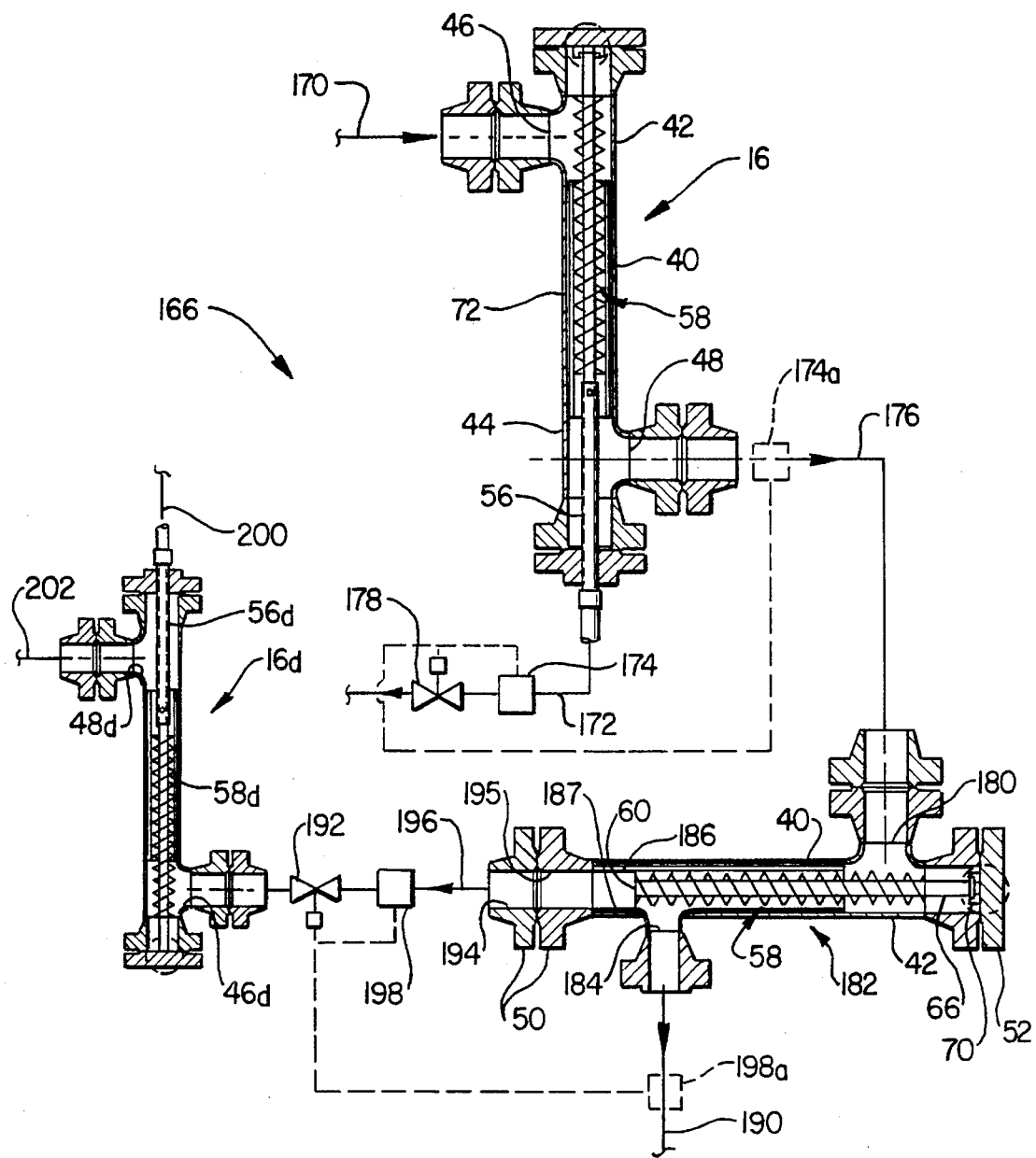
FIG. 5 is a schematic diagram of an alternate embodiment of a multistage separator system in accordance with the invention.

Referring now to FIG. 5, a separator system 166 in accordance with the invention is illustrated wherein a multiphase fluid stream including entrained solids, for example, is conducted to a first stage separator 16 by way of a conduit 170. Gas is separated from the fluid stream in the separator 16 and discharged by way of a discharge conduit 172 connected to the conduit 56. More dense fluid, such as liquid together with entrained solids, is discharged from separator 16 through conduit 176. A suitable sensor 174 is interposed in the conduit 172 which may comprise a densitometer or a liquid droplet detector, for example. If excessive carryover of liquid and/or entrained solids is occurring through the conduits 56 and 172, the fluid stream being discharged therethrough may be controlled by a motor operated throttling valve 178 interposed in conduit 172 to control the amount of gas flowing through the separator 16 that is removed by way of the conduits 172 and 56. Alternatively, a sensor 174a may be interposed in conduit 176 also, and be operable to control valve 178 if the composition of the fluid leaving the separator by way of conduit 176 is not in a desired range.

The conduit 176 is shown connected to the inlet port 180 of a second stage separator, generally designated by the numeral 182. The separator 182 is similar in some respects to the separator 16 except that the center conduit 56 is removed and a transverse fluid discharge port 184 is provided in a modified inner casing 186 similar to the inner casing 72 of the separator 16. However, the port 184 intersects the flowpath of fluid flowing through the stationary spiral baffle 58 upstream of the discharge end 60 of the baffle. The outer casing 40 is also modified to provide for the transverse discharge port 184. The baffle 58 is supported in casing 186 and may be connected to a flange 52 at boss 70 by way of the hub 66. The fluid taken off from the separator 182 through the discharge port 184 is conducted through a conduit 190.

Fluid not taken off through the discharge port 184 progresses through an axial discharge port 194 downstream of the baffle 58 to a discharge conduit 196 also having a suitable sensor 198 interposed therein for detecting liquid carryover, the composition of fluid flowing from the port 194 (such as a water-oil mixture) or the presence of solids in the fluid flowstream. The sensor 198 is operably connected to a controller for a motor operated valve 192 to control flow of fluid through the discharge port 194 and the conduit 196 to modify the carryover of the undesired component through the discharge port 194. The port 194 is formed in back to back flanges 50 suitably connected to casings 40 and 186 and also forming a passage 195 in communication with port 194. The axial passage 195 is also defined in part by the inner wall 187 of casing 186. Alternatively, as shown in FIG. 5, a sensor 198a may be interposed in the fluid discharge conduit 190 and responsive to the composition of the fluid flowing therethrough to control the motor operated throttling valve 192. Accordingly, the sensors 174 and 198, or the sensors 174a and 198a, may be interposed in the separator system 166, as shown, and operate on the respective valves 178 and 192 to prevent conduction of components of the fluid flowstream through the respective conduits 172 and 196 that are unwanted in these conduits.

The system illustrated in FIG. 5 may further comprise a separator 16d similar to the separator 16 but having a smaller diameter baffle 58d to accommodate the smaller quantity of fluid being discharged from the separator 182 by way of the conduit 196. The separator 16d may be operated to separate liquids of two different densities, for example, water from oil, wherein oil would flow from the separator 16d by way of a discharge conduit 200, connected to a center discharge conduit 56d, and the more dense fluid, typically water, would flow out of the separator 16d through the peripheral or transverse discharge port 48d and a discharge conduit 202.

The separator system 166 illustrated in FIG. 5 may be operated in different modes. For example, assuming that a fluid flowstream being conducted through the conduit 170 comprises a mixture of oil, water, gas and entrained particulate solids, separation of gas from the remainder of the mixture may be accomplished in the separator 16 wherein substantially all of the gas in the mixture is conducted through the discharge conduit 172 and the more dense mixture of oil, water and some entrained solids is discharged from the separator 16 by way of the conduit 176. If the sensor 174 indicates that an excessive amount of liquid is being carried over into the discharge conduit 172, the flow through the valve 178 may be adjusted to modify this carryover flow.

Fluid discharged from the separator 16 by way of the conduit 176 enters the separator 182 wherein, for example, some liquid and entrained solids are likely to be centrifuged to the periphery of the baffle 58 and flow out of the separator 182 by way of the discharge port 184 and the conduit 190. If the sensor 198 indicates that excessive solids, or a water and oil mixture, is being discharged through the passage 195 to conduit 196, the flow through the conduit 196 may be adjusted by the throttling valve 192. Assuming that entrained solids are removed from the system 166 by way of the separator 182 and the conduit 190, a mixture of water and oil, for example, may be discharged from the separator 182 by way of conduit 196 which is connected to the inlet port 46d of separator 16d. Separation of water from oil may occur in separator 16d with water leaving the separator 16d by way of conduit 202 and less dense oil by way of the center conduit 56d and discharge conduit 200 connected thereto.

The system 166 shown in FIG. 5 may be operated in another mode. Assuming that the fluid mixture entering the separator 16 by way of conduit 170 is a mixture of gas and liquid, the separator may operate to separate a sufficient amount of gas to provide a substantially dry gas flowstream leaving the separator 16 by way of the conduits 56 and 172 while some gas and all liquid will leave the separator 16 by way of the port 48 and conduit 176. Accordingly, a two-phase, gas and liquid mixture enters the separator 182 wherein substantially gas-free liquid may be taken off from the separator by way of the discharge port 184 and conduit 190 leaving a smaller flow rate two-phase mixture discharging from the separator 182 by way of conduit 196. Finally, remaining separation of gas from liquid could be effected in separator stage 16d. With this type of operation, substantially liquid-free gas is conducted from the system 166 by way of conduit 172 and substantially gas-free liquid is conducted from the system by way of conduit 190.

Moreover, it is contemplated that one or more of the separators and systems described above may be used to separate liquids of two different densities, such as oil from water, wherein a water-in-oil or oil-in-water emulsion has occurred, for example. Such operation may be particularly beneficial for well production operations wherein a water-oil emulsion is being produced and otherwise requires rather elaborate separation equipment and facilities to break the emulsion.

The separators 16, 16a, 16b, 16c, 16d, 122 and 182 may be constructed using conventional engineering materials used in oil and gas processing equipment and facilities. The operation of the separators described above is believed to be within the purview of one skilled in the art from the foregoing description. Those skilled in the art will appreciate that a particularly compact, mechanically uncomplicated and easy to operate separator system can be provided utilizing the separators 16, 16a, 16b, 16c, 16d, 122 and 182. These separators may, as mentioned above, be arranged in different configurations in parallel or series staging and the above-described systems are exemplary but advantageous arrangements.

Although preferred embodiments of the invention have been described in some detail herein, those skilled in the art will recognize that various substitutions and modifications may be made to the invention without departing from the scope and spirit of the appended claims.

What is claimed is:

1. A fluid separator system for separating fluids of different densities in a flowstream, comprising at least two of oil, water and gas, through a surface flowline, said system comprising:

a fluid separator interposed in said flowline comprising a casing, a fluid inlet port, a first fluid discharge port and a second fluid discharge port, said separator including an elongated spiral baffle disposed for inducing spiral fluid flow through said casing to separate more dense fluid from less dense fluid whereby said more dense fluid flows through said first discharge port downstream from said baffle and said less dense fluid flows through said second discharge port;

a first fluid discharge conduit connected to said first discharge port; and a second fluid discharge conduit connected to said second discharge port.

2. The system set forth in claim 1 wherein:

said second discharge conduit is operable to conduct gas separated from said fluid flowstream to at least one of a gas lift well, a gas injection well and a process flowstream.

3. The system set forth in claim 1 wherein:

one of said first and second discharge conduit includes a control valve interposed therein and operable to control the flow of fluid through said separator.

4. The system set forth in claim 3 including:

a sensor operably connected to one of said first and second discharge conduits for effecting operation of said control valve.

5. The system set forth in claim 1 including:

a valve interposed in said second discharge conduit to the flow of fluid through said separator during at least a start of fluid flow through said separator, said first discharge conduit and said second discharge conduit.

6. The system set forth in claim 1 including:

a second separator interposed in fluid communication with said first discharge conduit for effecting separation of fluids flowing through said first discharge conduit.

7. The system set forth in claim 6 including:

a third separator interposed in fluid communication with said first discharge conduit for effecting separation of fluids flowing through said second discharge conduit.

8. The system set forth in claim 7 wherein:

less dense fluid discharged from said second separator is conducted to said second discharge conduit for separation in said third separator.

9. The system set forth in claim 1 including:

a second separator interposed in fluid communication with said first discharge conduit for effecting separation of fluids flowing through said first discharge conduit, said second separator including a spiral baffle for effecting separation of said more dense fluid from said less dense fluid and a first discharge port and a second discharge port in said second separator for discharging said more dense fluid and said less dense fluids respectively, from said second separator.

10. The system set forth in claim 9 including:

a third separator connected to said second separator for receiving a fluid separated in said second separator, said third separator including a spiral baffle for effecting separation of more dense from less dense fluids in said third separator and a first discharge in said third separator for discharging said more dense and said less dense fluids, respectively, from said third separator.

11. The system set forth in claim 10 wherein:

said third separator includes a spiral baffle disposed therein for effecting separation of a more dense fluid from a less dense fluid.

12. The system set forth in claim 1 wherein:

said casing includes said spiral baffle interposed therein for forcing more dense fluid to flow along an inner wall of said casing and less dense fluid to flow along a hub of said spiral baffle, and said second discharge port is interposed in a conduit generally concentrically disposed with respect to said hub and at or downstream from a discharge end of said baffle for receiving said less dense fluid to be discharged through said second discharge conduit.

13. The system set forth in claim 12 wherein:

said first discharge port intersects said casing generally at a discharge end of said baffle and said conduit comprises an extension of said inner wall of said casing and is connected to said second discharge conduit.

14. The system set forth in claim 12 including: art outer casing disposed around and spaced from said casing to define a closed annular space; and a pressure sensor in fluid communication with said closed annular space to sense an increase in fluid pressure in said closed annual space caused by an opening in said casing.

15. The system set forth in claim 12 wherein:

said separator includes a first baffle section having a predetermined diameter and a second baffle section disposed downstream of said first baffle section in the direction of flow of fluid through said separator and having a diameter less than said first baffle section, and a fluid bypass passage between said first baffle section and a third discharge port of said separator for bypassing fluid flowing through said separator from said first baffle section directly to said third discharge port.

16. The separator device set forth in claim 1 wherein:

said second discharge port comprises an axial passage extending axially beyond a distal end of said baffle and downstream of said baffle in a direction of fluid flow through said device.

17. The separator device set forth in claim 1 wherein:

said baffle is supported in said casing by an elongated hub portion of said baffle said hub portion being supported by said casing.

18. A separator system particularly useful for a surface flowline conducting a multiphase fluid from a fluid production well comprising:

an elongated, generally cylindrical casing including an inlet fitting adapted to be connected to said flowline;

an elongated substantially helical baffle interposed in said casing and non-rotatable with respect to said casing, said baffle including a conduit substantially coaxial with a central longitudinal axis of said baffle and being operable to direct a fluid mixture through a passage formed by said baffle and said casing to effect separation of fluid of one density from fluid of a greater density into separate fluid flowstreams;

a passage formed in said casing downstream from said baffle and passing fluid of a greater density to a first discharge conduit connected to said casing; and a passage in said conduit for directing fluid of a lesser density to a second discharge conduit.

19. A separator system for separating at least two fluids of different densities from each other and particulate solids from a fluid, said separator system being adapted to be interposed in a fluid flowline and comprising:

a first separator including a first generally cylindrical casing, a first elongated spiral baffle disposed in said first casing, a first fluid inlet port in communication with said first baffle, a first fluid discharge port in fluid communication with said first casing and a second fluid discharge port in fluid communication with said first casing;

a second separator including a second casing and a second spiral baffle disposed in said second casing and having a second fluid inlet port in fluid communication with said second spiral baffle and said first discharge port of said first separator, a third discharge port from said second separator and a fourth discharge port from said second separator; and a third separator including a third casing and a third generally spiral baffle disposed therein, a third fluid inlet port in said third separator in fluid communication with said third baffle and with said fourth discharge port from said second separator, and a discharge port from said third separator and a sixth discharge port outlet from said third separator.

20. A separator system for separating a fluid mixture comprising fluids of at least two different densities, said separator system being adapted to be interposed in a fluid flowline for said fluid mixture, said separator system comprising:

a first separator including a first elongated casing and a first elongated spiral baffle disposed in said first casing, a fluid inlet port in communication with said first spiral baffle, a first fluid discharge port in communication with said casing for receiving a more dense fluid separated in said first separator and a second discharge port in communication with said casing for receiving a less dense fluid separated in said first separator;

a second separator including a second elongated casing and a second elongated spiral baffle disposed in said second casing of said second separator, said second separator including a fluid inlet port in communication with the first discharge port of said first separator for receiving said more dense fluid from said first separator, a first discharge port in communication with said casing of said second separator and a second discharge port in communication with said casing of said second separator for conducting fluid from said second separator which is substantially free of said less dense fluid discharged from said first separator.

21. The separator system set forth in claim 20 including:

a sensor interposed in a conduit connected to one of said first discharge port and said second discharge port of said first separator and operable to control fluid flow from said second discharge port of said first separator.

22. The system set forth in claim 20 including:

a sensor interposed in a conduit connected to one of said first discharge port and said second discharge port of said second separator and operable to control flow of fluid from said second discharge port of said second separator.

23. The system set forth in claim 20 including:

a third separator including a third casing and a third elongated spiral baffle disposed therein, a fluid inlet port in communication with said third spiral baffle and with said less dense fluid discharged from said second discharge port of said first separator, a first discharge port of said third separator in communication with said casing of said third separator and a second discharge conduit in communication with said casing of said third separator for conducting less dense fluid away from said third separator which has been separated from said more dense fluid in said first separator and said third separator, respectively.

24. A method for providing artificial lift gas for injection to a gas lift well, said lift gas being produced from a fluid production well having a surface flowline connected thereto for conducting a mixture of liquid and gas from said fluid production well, said method comprising the steps of:

providing a fluid separator interposed in said production flowline, said separator comprising an elongated casing, a spiral baffle disposed in said casing and defining a generally spiral flowpath for fluid flowing through said casing, a fluid inlet port in communication with said casing and said spiral baffle, a first fluid discharge port in communication with said casing for conducting liquid from said separator and a discharge conduit connected to said casing for discharging gas separated from liquid in said separator from said separator;

connecting said separator to said production flowline for receiving a fluid mixture from said fluid production well;

connecting said discharge conduit to said gas lift well;

conducting production fluid from said fluid production well through said separator and conducting gas separated in said separator to said gas lift well for use in lifting fluid therethrough.

25. The method set forth in claim 24 including the step of:

throttling the flow of fluid discharged from said first discharge port of said separator to maintain a predetermined pressure of at least one of fluid flowing from said fluid production well and gas being discharged through said discharge conduit to said gas lift well.

26. A method for separating a mixture of oil, water, gas and particulate solids entrained in said mixture comprising the steps of:

providing a multistage separator system including a first separator comprising a casing and an elongated spiral baffle disposed in said casing, a fluid inlet port to said casing, a first discharge port, and a discharge conduit in communication with said casing for conducting gas from said first separator, a second separator including a casing and an elongated spiral baffle disposed in said casing of said second separator, a fluid inlet port of said second separator connected to said first discharge port of said first separator, a first discharge port of said second separator and a second discharge port of said second separator, and a third separator including a casing and an elongated spiral baffle disposed therein, a fluid inlet port of said third separator connected to said second discharge port of said second separator, a first discharge port of said third separator and a discharge conduit of said third separator;

conducting said mixture to said first separator and separating gas from said mixture in said first separator for discharge from said first separator through said discharge conduit of said first separator;

conducting a mixture comprising substantially water, oil and entrained solids to said second separator and separating said entrained solids and at least some liquid from said second separator for discharge from said second separator through said first discharge port thereof; and conducting a mixture of oil and water from said second separator to said third separator and separating water from oil in said third separator for discharge of water through said first discharge port of said third separator and for discharge of oil through said discharge conduit of said third separator.

27. A method for separating fluids of different densities from each other in a mixture of said fluids of different densities comprising the steps of:

providing a multistage separator system including a first separator comprising a casing and an elongated spiral baffle disposed in said casing, a fluid inlet port to said casing, a first discharge port, and a discharge conduit in communication with said casing for conducting a low density fluid from said first separator, a second separator including a casing and an elongated spiral baffle disposed in said casing of said second separator, a fluid inlet port of said second separator connected to said first discharge port of said first separator, a first discharge port of said second separator and a second discharge port of said second separator;

conducting said fluid mixture to said first separator and separating a low density fluid from said fluid mixture in said first separator for discharge from said first separator through said discharge conduit of said first separator; and conducting the remainder of said fluid mixture to said second separator and separating a most dense fluid from said fluid mixture in said second separator for discharge from said second separator through said first discharge port of said second separator whereby said low density fluid and said most dense fluid separated by said system are substantially free of other fluids in said mixture.

28. The method set forth in claim 27 including the step of:

providing a third separator including a casing and an elongated spiral baffle disposed therein, a fluid inlet port of said third separator connected to said second discharge port of said second separator, a first discharge port of said third separator and a discharge conduit of said third separator;

conducting a fluid mixture to said third separator from said second discharge port of said second separator; and separating fluids of different densities in said third separator for flow of a more dense fluid of said fluid mixture from said third separator through said first discharge port of said third separator and discharge of the less dense fluid of said fluid mixture from said third separator through said discharge conduit of said third separator.

* * * * *